INVENTOR.
John E. Young
BY H. S. Grover
ATTORNEY

Feb. 6, 1951 J. E. YOUNG 2,540,640

ELECTRON DISCHARGE DEVICE SYSTEM FOR OBTAINING SIMILAR OR DIFFERENTIAL TUNING ADJUSTMENTS

Filed March 7, 1947 2 Sheets-Sheet 2

INVENTOR.
John E. Young
BY H. S. Grover
ATTORNEY

Patented Feb. 6, 1951

2,540,640

UNITED STATES PATENT OFFICE 2,540,640

ELECTRON DISCHARGE DEVICE SYSTEM FOR OBTAINING SIMILAR OR DIFFERENTIAL TUNING ADJUSTMENTS

John Ellwood Young, Merchantville, N. J., assignor to Radio Corporation of America, a corporation of Delaware Application March 7, 1947, Serial No. 733,076

12 Claims. (Cl. 250—40)

This invention relates broadly to an arrangement for simultaneously obtaining similar or differential tuning adjustments of a pair of adjustable elements in an electron discharge device system.

In operating a pair of vacuum tube amplifiers in parallel relation, it has been customary to feed the input electrodes of the tubes by individual sections or branches of transmission line connected to a common feed point, and to obtain outputs from the two tubes also by means of individual sections or branches of transmission line connected to a common output point, and to make the input and output branching lines, respectively, identical in length and characteristics. In such a system, it has been customary to attempt to make the circuits associated with each amplifier tube likewise identical. Heretofore, independent controls have been provided on each of the paralleled amplifiers to perform the various tuning functions. At high frequencies, however, the desired identity of characteristics in correspondingly positioned circuits is difficult to obtain, because of the large effect minute mechanical changes in a tuning or couplng element may have on the electrical characteristics of its associated circuit. For this reason the tuning of such paralleled amplifiers has been extremely difficult.

An object of the present invention is to provide individual reversible motors for the controls of an electron discharge device system and by means of a switching arrangement, enable any pair of these controls to operate similarly to the same degree either in the same or opposite directions, and thus facilitate the adjustment of the system.

Another object is to provide a means for readily compensating for dissimilarities in the two line branches of the input or output circuits of paralleled vacuum tube amplifiers, whereby it becomes practical to use branching circuits of definitely dissimilar characteristics.

A further object is to provide a technique of obtaining similar or differential tuning adjustments which will simplify the tuning of paralleled amplifiers at high frequencies.

A feature of the invention lies in the switching arrangement for a plurality of pairs of reversible motors, whereby a single switch used for all pairs of motors acts as a reversing switch for reversing the direction of rotation of one motor in each pair relative to the direction of rotation of the other motor in the same pair. An important advantage of the switching arrangement of the invention is that no tuning can be effected unless the reversing switch is first positioned in other than a neutral setting.

A more detailed description of the invention follows in conjunction with a drawing wherein.

Figure 1:
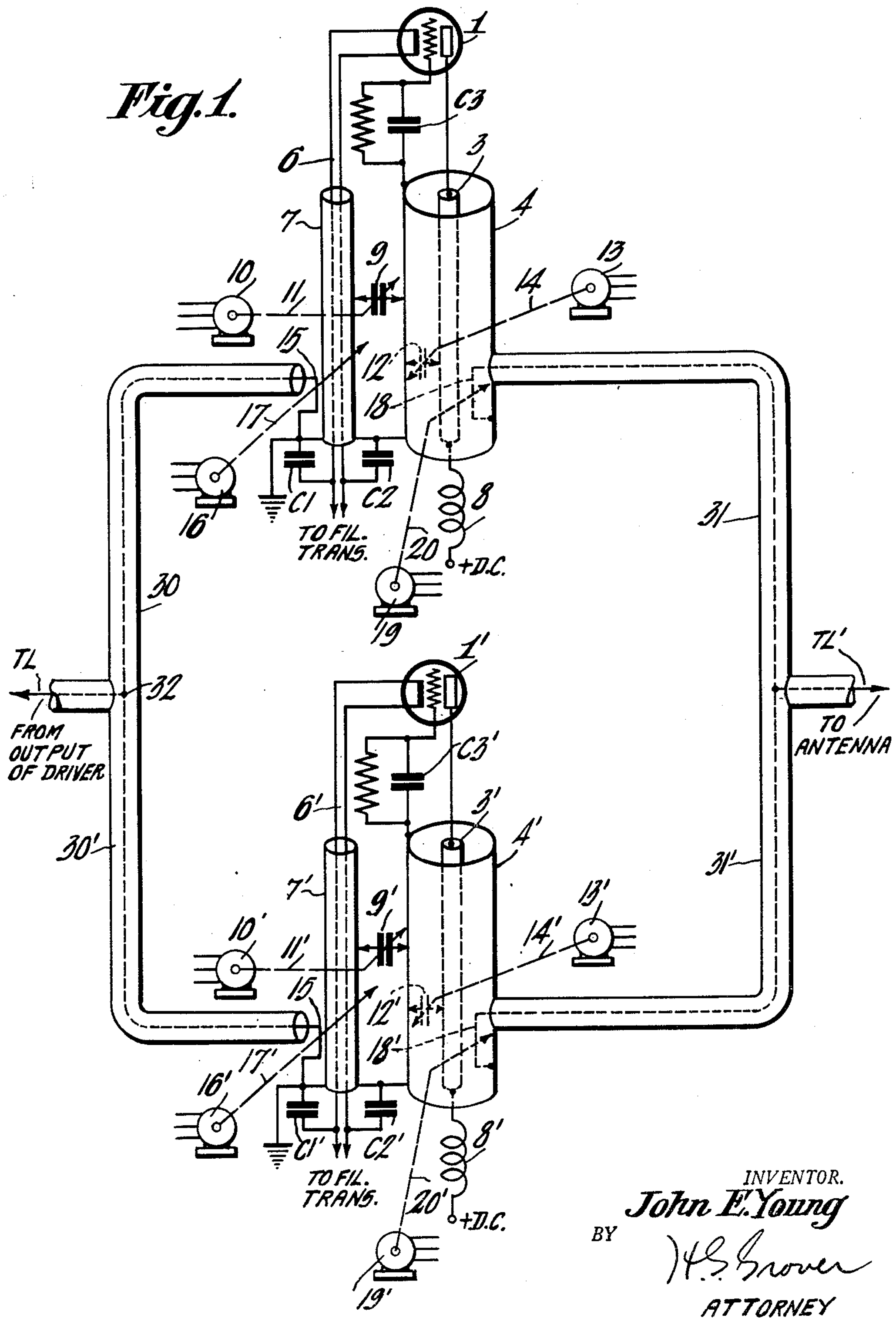
Fig. 1 illustrates, schematically, a pair of vacuum tube amplifier stages coupled together in electrically parallel relation, and having adjustable elements individually controlled by reversible motors in accordance with the principles of the invention, whereby correspondingly positioned controls can be simultaneously operated in the same or opposite directions.

Referring to Fig. 1 in more detail, there are shown a pair of triode vacuum tube amplifier stages 1 and 1′ coupled together in electrically parallel relation.

Amplifier 1 has its grid and anode connected to the outer and inner conductors 3 and 4, respectively, of a concentric line tank circuit. The filament of amplifier 1 is fed by a pair of heater wires 6 extending through the interior of a metallic tubular conductor 7 in such manner that wires 6 and tubular conductor 7 form a resonant cathode line. The outer conductors of resonant cathode line 6, 7 and output line 3, 4 are grounded, although it should be observed that the cathode line is grounded at a voltage nodal point. Heating supply for the filament is fed to conductors 6 through a filament transformer, not shown, connected to wires 6 at the end of the cathode line farthest removed from the vacuum tube 1. Anode polarizing potential is fed to inner conductor 3 through choke coil 8. Condensers C1, C2 and C3 are radio frequency bypass capacitors. It will thus be noted that the grid of tube 1 is grounded for radio frequency energy.

The cathode line 6, 7 is resonated to the operating frequency by means of a variable capacitor 9 which is controlled by a reversible motor 10 through a shaft 11. The anode tank line 3, 4 is tuned by means of a traveling slider or short-circuiting bar containing a built-in capacitor 12, and the position of this slider is controlled by a reversible motor 13 through a shaft 14.

The high frequency input signal is supplied to the cathode circuit 6, 7 of amplifier stage 1 by means of a variable coupling loop 15 which is magnetically coupled to the outer conductor 7. The inner conductors 6 of the cathode line vary in radio frequency potential with the outer conductor 7. Input loop 15 has its coupling to the cathode line varied and controlled by a reversible motor 16 through a shaft 17.

The high frequency output from amplifier stage 1 is extracted by variable coupling loop 18 which is located in the interior of anode line 3, 4. The degree of coupling of loop 18 to line 3, 4 is controlled by reversible motor 19 through shaft 20.

Amplifier stage 1' is arranged similarly to amplifier 1, and because the correspondingly positioned circuit elements of stage 1 operate and are arranged similarly to those of stage 1' they have been given the same reference characters except for the prime designations.

The paralleled amplifiers 1 and 1' are fed with input waves through branches or sections of transmission line 30, 30' from a common feed point 32, in turn, coupled to a line TL extending to a suitable source of input waves, for example the output tank circuit of a preceding stage.

From the foregoing, it will be seen that the driver or input voltage supplied to line TL divides approximately equally into both branches 30 and 30' and is conveyed to the two input coupling loops 15 and 15'.

The output coupling loops 18 and 18' feed their respective outputs through branches or sections of transmission line 31, 31' to a common junction point and then to a single common line TL' extending to a suitable load, such as an antenna.

Each of the reversible motors is preferably of the capacitor-reversing type to which alternating current is supplied at any one time over only two of the three leads shown associated with each motor. Those motors which drive correspondingly located adjustable elements in the two amplifier stages rotate at approximately the same speed. Thus, the pair of motors 10 and 10' which drive variable capacitors 9 and 9' respectively, operate at the same speed, and the pair of motors 16 and 16' which vary the inductive coupling of input loops 15 and 15', respectively, relative to their associated cathode lines, also operate at the same speed, and so on.

By means of the switching feature of the present invention, as will appear hereinafter in connection with the description of Fig. 2, it is proposed to energize each pair of motors which control corresponding adjusting elements in the paralleled amplifiers, by a single switch in such manner that the motors of each pair can rotate in the same or opposite directions, to thereby control corresponding adjusting or tuning elements similarly to the same degree or differentially. I am thus able to obtain either in-phase or differential tuning of like tuning or control elements on the two sides of the parallel circuit.

Figure 2:
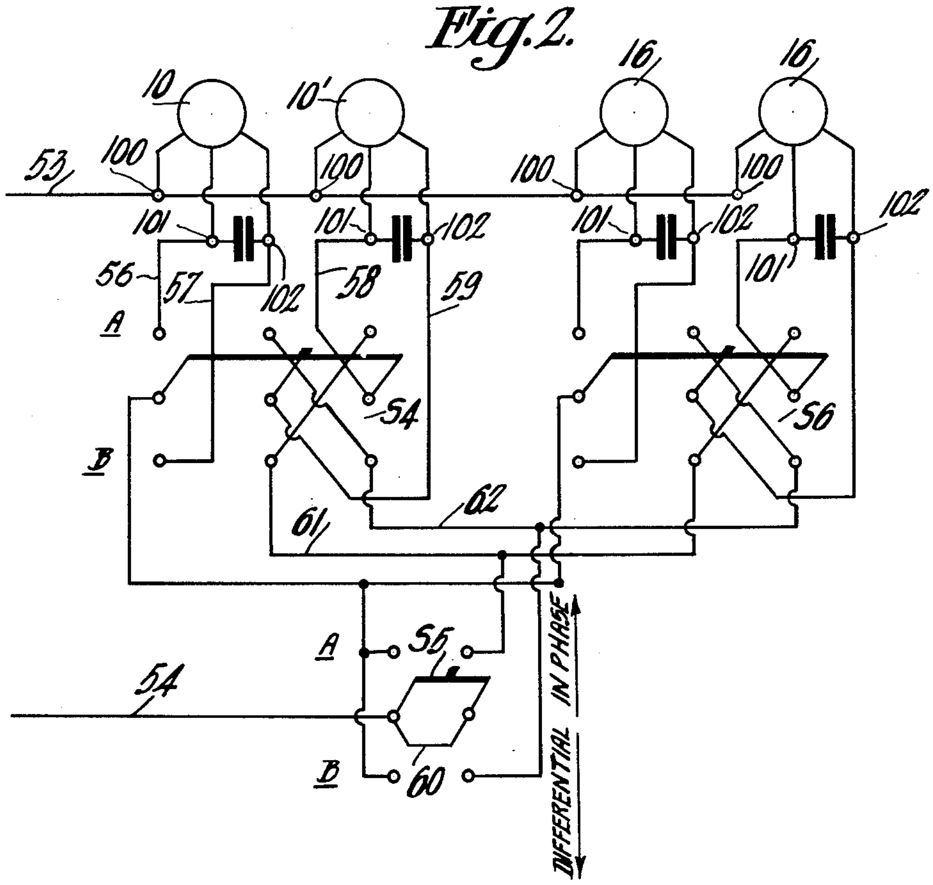
Fig. 2 illustrates, schematically, an electrical switching arrangement for controlling the pairs of reversible motors shown in Fig. 1.

Fig. 2 shows the switching arrangement used to control only two pairs of reversible motors 10, 10' and 16, 16', although it should be understood that as many pairs of motors as desired may be added to this arrangement, and be similarly controlled. The motors are the same as those shown in the system of Fig. 1 and have been given the same reference characters. Thus, motors 10 and 10' comprise one pair and control correspondingly positioned cathode tuning capacitors 9 and 9'. Motors 16 and 16' comprise another pair and control correspondingly positioned input coupling loops 15 and 15'. In the same manner, pairs of motors 19, 19' and 13, 13' may be and are preferably added to Fig. 2 to control correspondingly positioned adjusting elements, but are not shown in Fig. 2 inasmuch as the principles of operation are the same as for pairs of motors 10, 10' and 16, 16' and any additional illustration will not add to but may detract from the clarity of the drawing.

Figure 2A:
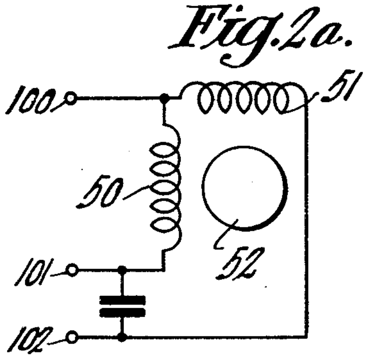
Fig. 2*a* schematically illustrates the electrical circuit of a capacitor-reversing type of motor which can be used in the invention.

Each motor is of the capacitor-reversing type, as shown in Fig. 2*a*, and includes a pair of stator windings 50 and 51, a rotor 52, and three terminals 100, 101 and 102. A capacitor is connected across terminals 101 and 102. The motor is adapted to be energized by alternating current. The application of A. C. power to terminals 100 and 102 will cause the motor to rotate in one direction, while the application of this same A. C. power to terminals 100 and 101 will cause the motor to rotate in an opposite direction.

Referring to Fig. 2 in more detail, it will be noted that there is a single alternating current power supply line 53, 54 for supplying 220 volts A. C. to operate the different pairs of motors 10, 10' and 16, 16'. For controlling the direction of rotation of motors 10 and 10' there is provided a three-blade, double-throw switch S4 and a two-blade double throw switch S5. Switch S4 has three positions; namely, an upper closed position designated A, a lower closed position designated B, and a middle or neutral position in which the switch is unoperated and the knife blades do not engage any contacts. One side 54 of the A. C. supply is connected to both blades of switch S5, while the other side 53 of the A. C. supply is connected to the terminals 100 of all of the motors. Switch S5 has both of its blades directly connected together by a wire connection 60.

The upper and lower center and right contacts of the switch S4 are directly connected together in criss-cross manner as shown and connected to the upper and lower right contacts of switch S5 by connections 61 and 62. The terminals 101 and 102 of motor 10 are connected through leads 56 and 57, respectively to the upper and lower left contacts of switch S4. The terminals 101 and 102 of motor 10' are connected through leads 58 and 59 to the right and middle blades of switch S4.

The directions of rotation of the pair of motors 10 and 10' are given in the following table in which an arbitrary assumption has been made that, if voltage is applied between terminals 100 and 101, rotation will be in a clockwise direction; and if voltage is applied between terminals 100 and 102, rotation will be in a counter-clockwise direction. The operating paths for these motors are obvious to anyone skilled in the art from a mere inspection of the drawing:

| Position of Switch S4 | Position of Switch S5 | Direction Rotation Motor 10 | Direction Rotation Motor 10' |
|---|---|---|---|
| A | A | Clockwise | Clockwise. |
| A | B | do | Counter-clockwise. |
| B | A | Counter-clockwise | Do. |
| B | B | do | Clockwise. |
| Unoperated | A or B | None | None. |

It will thus be observed that the direction of rotation for motor 10 depends upon the A or B position of switch S4. If switch S4 is on the A position and switch S5 on the B position, motors 10 and 10' will rotate in relatively opposite directions. If switches S4 and S5 are both on the B positions the motors 10 and 10' will rotate in relatively opposite directions but, differently from their directions of rotation when switch S4 is on the A position and switch S5 on the B position.

The pairs of motors 16 and 16' are connected to the same power supply through lead 53 and switch S6. The terminals 100 of motors 16 and 16' are directly connected together. The terminals 101 and 102 of both motors 16 and 16' are connected to switch S6 in the same manner as the corresponding terminals of motors 10 and 10' are connected to switch S4. The lower middle and right contacts of switch S6 are connected to correspondingly positioned contacts on switch S4 through leads 61 and 62.

Motors 16 and 16' will rotate in directions like those set forth for motors 10 and 10' for comparable settings of switches S6 and S5.

Switch S5 acts as a reversing switch for the terminals 101 and 102 of one of the motors (viz., the prime designated motor) of each pair relative to the other motor of the same pair. Hence, the same switch S5 can be used in common for any desired plurality of pairs of motors.

When switch S5 is in the unoperated or middle position in which its blades do not engage any of its contacts, it prevents the operation of any of the motors of any pair.

To operate additional pairs of motors it is only necessary to add an additional switch like S6 for each additional pair of motors and to connect these additional motors in a manner similar to the connections from motors 16, 16' to the switches.

It will thus be seen that the invention provides a ready means available to differentially tune two halves of the parallel circuit in order to accommodate any electrical differences between the two parallel branches, so that both electron discharge devices look into equivalent circuits, and therefore operate under the same conditions. Furthermore, when the operator, by means of the reversing switch, and by reference to the meters indicating anode current, grid current and power output, has adjusted the two sides of the circuit to balance, the tracking over the small changes in tuning required to keep the circuits resonated, for example, when it becomes necessary to replace one of the tubes, may be accomplished by manipulation of the necessary tuning switches, with the reversal switch in the proper position to drive the motors in-phase. In effect, therefore, it becomes possible to tune the circuits of the two branches by a common control and thereby greatly simplify the task of the operator.

Although the invention has been described with particular reference to a pair of tubes connected in electrically parallel relation, it should be understood that the principles of the invention are equally applicable for controlling adjustments of the input and output tuning controls of a single vacuum tube circuit, such as an amplifier.

In one embodiment of the invention successfully tried out in practice, the paralleled amplifiers were RCA type power amplifier tubes in a 50 kw. frequency modulation transmitter operating over a frequency range of 88 to 104 megacycles.

What is claimed is:

1. An electron discharge device system including one or more multi-electrode vacuum tubes having resonant circuits and a pair of adjustable electrical tuning elements in circuit with the electrodes of said tubes for varying the tuning of said resonant circuits, a separate reversible motor controlling each adjustable tuning element, and switching means coupled to said motors for operating them simultaneously to run either in the same direction or in opposite directions relative to each other at approximately the same speed at the option of the operator, said switching means including a pair of manually operable interconnected switches.

2. An electron discharge device system having a pair of multi-electrode electron tubes and a pair of similarly positioned electrical tuning controls in circuit with corresponding electrodes of said tubes, a pair of reversible motors for said controls, each motor being linked to a single tuning control, a single source of power supply for said pair of motors, and switching mechanism coupled to said motors for causing them to rotate simultaneously in the same direction or simultaneously in opposite directions relative to each other and at the same speed at the option of the operator, said switching means including a pair of manually operable interconnected switches.

3. An electron discharge device system having a pair of multi-electrode electron amplifier tubes and a pair of similarly positioned adjustable electrical tuning elements in circuit with corresponding electrodes of said tubes, a separate capacitor-type of reversible motor linked to each adjustable element, a common source of power supply for said motors, and a pair of manually operable interconnected switches connected to said source and to said motors and to each other in such manner that said motors run simultaneously in the same direction or in opposite directions relative to each other depending upon the operation of said switches, one of said switches being a reversing switch for one of said motors relative to the other motor.

4. An electron discharge device system having a pair of multi-electrode vacuum tube amplifiers connected in electrically parallel relation, said amplifiers having a plurality of similarly positioned controls in circuit with corresponding electrodes, a separate reversible motor linked to each of said controls, a common source of power supply for all of said motors, and switching means connected to said source and said motors for causing the motors connected to like controls to run simultaneously in the same direction or opposite directions relative to each other at the option of the operator, said switching means including a pair of manually operable interconnected switches.

5. An electron discharge device system having a pair of multi-electrode vacuum tube amplifiers connected in electrically parallel relation, a radio frequency current carrying line, a pair of branch lines connected at one end to said line and coupled at their other ends to similar circuits coupled to corresponding electrodes of said amplifiers through individual adjustable coupling loops, a reversible motor linked to each coupling loop for varying the degree of magnetic coupling between the loop and the circuit in association therewith, and common switching mechanism coupled to said motors for operating said motors simultaneously in the same direction or opposite directions relative to each other at the option of the operator, said switching mechanism including a pair of manually operable multi-blade double-throw switches having interconnected contacts.

6. An electron discharge device system having a pair of multi-electrode vacuum tube amplifiers connected in electrically parallel relation, said amplifiers including in circuit with corresponding electrodes tunable line-type electrical resonators each having a movable tuning slider, a reversible motor linked to each tuning slider for moving the same over a portion of the length of its associated resonator, and common switching means coupled to said reversible motors for causing them to operate simultaneously in the same direction or in opposite directions relative to each other at the option of the operator, to thereby cause said sliders to simultaneously move in the same or opposite directions over their respective resonators, said switching means including a pair of manually operable interconnected multi-blade switches.

7. An electron discharge device system including a pair of multi-electrode electron tubes and a pair of similarly positioned adjustable tuning elements in circuit with the electrodes of said tubes, a separate reversible A. C. motor linked to and controlling each adjustable element, said motors being similar, each of said motors having first, second and third terminals, a common two-conductor A. C. power supply line for said motors, first and second double-throw, multiple blade switches, one of said switches having three blades and a pair of contacts on opposite sides of each blade, connections between the second and third terminals of one motor and the outer contacts associated with one outer blade of said three-blade switch and cross-connections between the other contacts associated with the other two blades of said three-blade switch, a connection between said one outer blade and a pair of similarly positioned outer contacts on one side of said other switch, connections between said other contacts of the three-blade switch and the other outer contacts on the other side of the other switch, a connection between the first terminal of one motor and a corresponding terminal of the other motor and to one conductor of said power line, separate connections from the second and third terminals of the other motor to the other two blades of said three-blade switch, and a connection from the other conductor of said power line to the outer blades of said other switch.

8. An electron discharge device system having a pair of multi-electrode electron tubes and a pair of similarly positioned tuning controls in circuit with corresponding electrodes of said tubes, a pair of reversible alternating current motors for said controls, each motor having three terminals, a connection between one terminal of one motor and a corresponding terminal of the other motor, individual condensers connected across the other two terminals of said motors, a pair of double-throw multiple blade switches, connections from one of said switches to two terminals of one motor, connections from said same switch to the corresponding two terminals of the other motor, a two-conductor A. C. power supply line, a connection from one conductor of said line to the third terminal of both motors, and a connection from the other conductor of said line to said other switch, and connections between the contacts of one of said switches and between said switches so arranged that said motors run simultaneously only when both of said switches are operated and one switch acts as a reversing switch for one motor relative to the other motor.

9. An electron discharge device system having a pair of multi-electrode electric tubes in circuit with each other, said tubes having similarly positioned adjustable electrical tuning controls in circuit with corresponding electrodes, separate reversible motors linked to said controls, a common source of power supply for said motors, switching mechanism including a plurality of double-throw multiple blade switches having interconnected contacts, and connections from said switches to said source and to said motors and to each other so constructed and arranged that any predetermined pair of said motors operate simultaneously in the same or opposite directions, depending upon the operated positions of said switches.

10. An electron discharge device system including a pair of adjustable tuning elements for electron discharge device electrodes of said system, a separate reversible A. C. motor linked to and controlling each adjustable element, said motors being similar, each of said motors having first, second and third terminals, a common two-conductor A. C. power supply line for said motors, first and second double-throw, multiple blade switches, one of said switches having three blades and three contacts in the same straight line for association with each blade, connections between the second and third terminals of one motor and the outer contacts associated with one outer blade of said three-blade switch and cross-connections between the other outer contacts associated with the other two blades of said three-blade switch, a connection between said one outer blade and a pair of similarly positioned contacts on one side of said other switch, connections between said other outer contacts of the three-blade switch and the other contacts on the other side of the other switch, a connection between the first terminal of one motor and a corresponding terminal of the other motor and to one conductor of said power line, separate connections from the second and third terminals of the other motor to the other two blades of said three-blade switch, and a connection from the other conductor of said power line to the blades of said other switch.

11. An electron discharge device system having a pair of tuning controls for electron discharge device electrodes of said system, a pair of reversible alternating current motors for said controls, each motor having three terminals, a connection between one terminal of one motor and a corresponding terminal of the other motor, individual condensers connected across the other two terminals of said motors, a pair of double-throw multiple blade switches, connections from one of said switches to two terminals of one motor, connections from said same switch to the corresponding two terminals of the other motor, a two-conductor A. C. power supply line, a connection from one conductor of said line to the third terminal of both motors and which third terminal corresponds to said aforementioned one terminal, and a connection from the other conductor of said line to said other switch, and connections between the contacts of one of said switches and between said switches so arranged that said motors run simultaneously only when both of said switches are operated and one switch sets as a reversing switch for one motor relative to the other motor.

12. An electron discharge device system including one or more multi-electrode vacuum tubes having a pair of adjustable elements in circuit with the electrodes of said tubes, a separate alternating current reversible motor controlling each adjustable element, said motors being similar and each having first, second and third terminals, a connection between said first terminals, a two-conductor A. C. power line for said motors, a connection from one conductor of said power line to said first terminals, a double-throw multi-blade switch having contacts connected to the second and third terminals of one of said motors and blades connected to the second and third terminals of said other motor, another double-throw multi-blade switch having blades connected to the other conductor of said power line and contacts connected to the contacts of said first switch, one of said switches acting as a reversing switch for one of said motors relative to the other motor.

JOHN ELLWOOD YOUNG.

REFERENCES CITED

The following references are of record in the file of this patent:

UNITED STATES PATENTS

| Number | Name | Date |
|---|---|---|
| 1,970,315 | Jones | Aug. 14, 1934 |
| 2,095,980 | Hansell | Oct. 19, 1937 |
| 2,214,154 | Adams | Sept. 10, 1940 |
| 2,244,725 | Peterson | June 10, 1941 |
| 2,310,695 | Higgins | Feb. 9, 1943 |
| 2,376,667 | Cunningham et al. | May 22, 1945 |
| 2,407,267 | Ginzton | Sept. 10, 1946 |